(12) United States Patent
Buttolo et al.

(10) Patent No.: US 10,585,439 B2
(45) Date of Patent: Mar. 10, 2020

(54) VEHICLE INSPECTION

(71) Applicant: Ford Global Technologies, LLC, Dearborn, MI (US)

(72) Inventors: Pietro Buttolo, Dearborn Heights, MI (US); Stuart C. Salter, White Lake, MI (US); Annette Lynn Huebner, White Lake, MI (US); Brent Young, Seattle, WA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 198 days.

(21) Appl. No.: 15/689,604

(22) Filed: Aug. 29, 2017

(65) Prior Publication Data

US 2019/0064836 A1 Feb. 28, 2019

(51) Int. Cl.
| | |
|---|---|
| *G05D 1/00* | (2006.01) |
| *G06F 7/00* | (2006.01) |
| *G05D 1/02* | (2020.01) |
| *G05D 1/10* | (2006.01) |
| *G06K 9/18* | (2006.01) |
| *G06K 9/00* | (2006.01) |
| *G06T 7/70* | (2017.01) |
| *G06T 11/60* | (2006.01) |

(52) U.S. Cl.
CPC ......... *G05D 1/0246* (2013.01); *G05D 1/0022* (2013.01); *G05D 1/0027* (2013.01); *G05D 1/0202* (2013.01); *G05D 1/0212* (2013.01); *G05D 1/101* (2013.01); *G06K 9/0063* (2013.01); *G06K 9/00771* (2013.01); *G06K 9/18* (2013.01); *G06T 7/70* (2017.01); *G06T 11/60* (2013.01); *G06T 2207/10032* (2013.01); *G06T 2207/30232* (2013.01); *G06T 2207/30252* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,983,161 A | * | 11/1999 | Lemelson | G01S 19/11 340/436 |
| 5,995,898 A | * | 11/1999 | Tuttle | G07B 15/063 427/255.31 |
| 6,072,248 A | * | 6/2000 | Muise | B60R 25/04 180/287 |
| 8,630,765 B2 | | 1/2014 | Chen | |
| 8,698,896 B2 | * | 4/2014 | Nerayoff | H04N 7/181 348/148 |
| 8,818,572 B1 | * | 8/2014 | Tofte | B64C 39/024 701/2 |

(Continued)

FOREIGN PATENT DOCUMENTS

CN 104091425 A 10/2014

OTHER PUBLICATIONS

Swedberg, "BLE Eavesdrops on Machine Health With Augury System", © 2017 Emerald Expositions, LLC.

*Primary Examiner* — Bhavesh V Amin
(74) *Attorney, Agent, or Firm* — Frank A MacKenzie; Bejin Bieneman PLC

(57) ABSTRACT

A system includes a computer that is programmed to receive, from an aerial drone, image data that identifies a vehicle, a vehicle location, and a vehicle status; and based on the received image data, transmit an instruction to the vehicle to actuate a vehicle component.

20 Claims, 5 Drawing Sheets

(56) References Cited

U.S. PATENT DOCUMENTS

| | | | |
|---|---|---|---|
| 9,370,041 B2 | 6/2016 | Witkowski et al. | |
| 9,505,494 B1* | 11/2016 | Marlow | B64C 39/024 |
| 9,809,305 B2* | 11/2017 | Buchmueller | B64C 39/024 |
| 9,824,507 B2* | 11/2017 | Chen | G07C 5/008 |
| 2004/0203379 A1* | 10/2004 | Witkowski | H04L 12/66 |
| | | | 455/41.2 |
| 2005/0267657 A1* | 12/2005 | Devdhar | G06K 9/00208 |
| | | | 701/33.4 |
| 2011/0202471 A1* | 8/2011 | Scott | G06Q 30/02 |
| | | | 705/306 |
| 2014/0039987 A1* | 2/2014 | Nerayoff | H04N 7/181 |
| | | | 705/13 |
| 2015/0062339 A1* | 3/2015 | Ostrom | H04N 7/185 |
| | | | 348/144 |
| 2015/0134143 A1* | 5/2015 | Willenborg | G05D 1/0094 |
| | | | 701/2 |
| 2016/0257401 A1* | 9/2016 | Buchmueller | B64C 39/024 |
| 2017/0039424 A1* | 2/2017 | Nerayoff | G06Q 20/145 |
| 2017/0142552 A1 | 5/2017 | Salter et al. | |
| 2017/0336788 A1* | 11/2017 | Iagnemma | G05D 1/0038 |
| 2018/0050800 A1* | 2/2018 | Boykin | H04N 5/23206 |
| 2019/0026961 A1* | 1/2019 | Dudar | B60K 11/085 |

* cited by examiner

VEHICLE INSPECTION

BACKGROUND

Vehicle inspections can include various vehicle components such as a battery, tires, electronics systems, lights, etc. are tested. A vehicle body can be inspected for damages. However, technical infrastructures are lacking with respect to inspecting components such as vehicle lights.

DETAILED DESCRIPTION

Introduction

Figure 1:
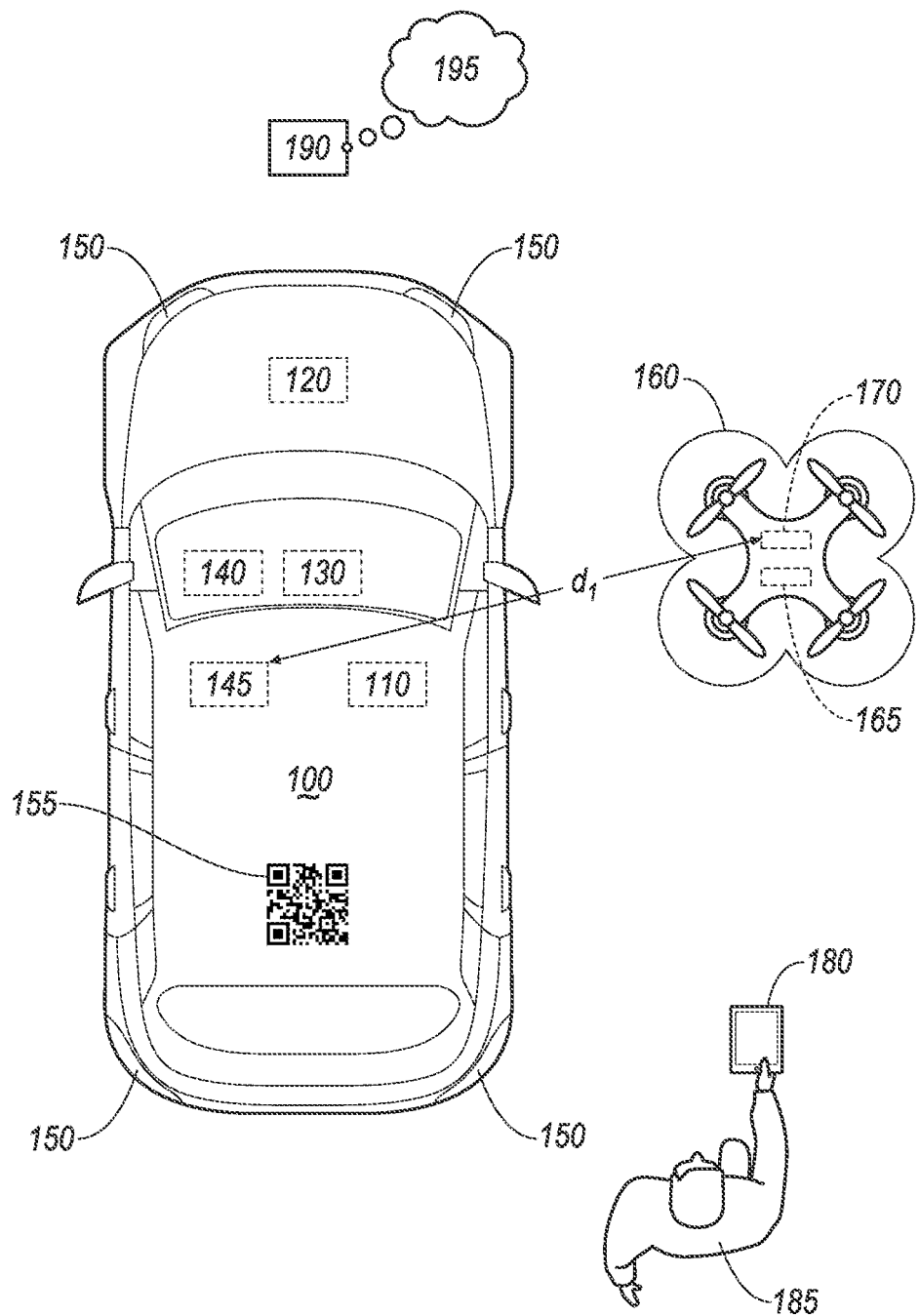
FIG. 1 is a block diagram of an example vehicle, an example drone, and an exemplary handheld device.

Disclosed herein is a system including a computer that is programmed to receive, from an aerial drone, image data that identifies a vehicle, a vehicle location, and a vehicle status, and based on the received image data, transmit an instruction to the vehicle to actuate a vehicle component.

The computer may be further programmed to identify the vehicle based on the received image data.

The computer may be further programmed to receive, via the aerial drone, a vehicle wireless signal, and determine the status of the vehicle based on the received vehicle wireless signal and the received image data.

The computer may be further programmed to receive, via the aerial drone, a plurality of vehicle wireless signals from a plurality of vehicles, and identify the respective vehicle wireless signal of the vehicle from the plurality of wireless signals based on the received image data.

The computer may be further programmed to identify the vehicle based on at least one a vehicle identifier, a vehicle model, and a vehicle color included in the received image.

The vehicle identifier may include a graphical pattern on a body of the vehicle.

The computer may be further programmed to actuate the vehicle component by determining a destination based on the received status of the vehicle, and navigating the vehicle to the determined destination by at least one of accelerating, steering, and braking.

The computer may be further programmed to deploy the aerial drone to fly over a plurality of vehicles, generate an image including the plurality of vehicles, and overlaying a respective vehicle status of each of the vehicles on the generated image.

Overlaying the respective vehicle status may include displaying one of an approved and deficient status for each of the plurality of vehicles.

Deploying the drone to fly over the plurality of vehicles may further include determining a flight route based on location coordinates of the plurality of vehicles, and actuating the drone to fly based on the determined flight route.

The computer may be further programmed to receive a handheld device location, and superimpose the handheld device location on the generated image.

The computer may be further programmed to receive a criterion, wherein the criterion includes at least one of approved vehicles, deficient vehicles, low fuel vehicles, and next shipping batch of vehicles; and actuate a vehicle exterior light based on the received criterion.

The system may further include a second computer included in the aerial drone, programmed to determine the location of the vehicle based on at least one of vehicle sensor data and drone sensor data.

Further disclosed herein is a method including receiving, from an aerial drone, image data that identifies a vehicle, a vehicle location, and a vehicle status; and based on the received image data, transmitting an instruction to the vehicle to actuate a vehicle component.

The method may further include identifying the vehicle based on the received image data.

The method may further include receiving, via the aerial drone, a vehicle wireless signal, and determining the status of the vehicle based on the received vehicle wireless signal and the received image data.

The method may further include identifying the vehicle based on at least one a vehicle identifier, a vehicle model, and a vehicle color included in the received image.

The method may further include deploying the aerial drone to fly over a plurality of vehicles, generating an image including the plurality of vehicles, and overlaying a respective vehicle status of each of the vehicles on the generated image.

Deploying the drone to fly over the plurality of vehicles may further include determining a flight route based on location coordinates of the plurality of vehicles, and actuating the drone to fly based on the determined flight route.

The method may further include receiving a criterion, wherein the criterion includes at least one of approved vehicles, deficient vehicles, low fuel vehicles, and next shipping batch of vehicles, and actuating a vehicle exterior light based on the received criterion.

Further disclosed is a computing device programmed to execute the any of the above method steps. Yet further disclosed is an aerial drone comprising the computing device. Yet further disclosed is a vehicle comprising the computing device.

Yet further disclosed is a computer program product comprising a computer readable medium storing instructions executable by a computer processor, to execute the any of the above method steps.

Exemplary System Elements

FIG. 1 illustrates a vehicle 100, a drone 160, and a handheld device 180. The vehicle 100 may be powered in a variety of known ways, e.g., with an electric motor and/or internal combustion engine. The vehicle 100 may include any automobile such as a car, a truck, a sport utility vehicle, a crossover vehicle, a van, a minivan, etc. The vehicle 100 may include a computer 110, actuator(s) 120, sensor(s) 130, a human machine interface (HMI) 140, a wireless communication interface 145, and exterior lights 150.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous mode, a semi-autonomous mode, or a non-autonomous mode. For purposes of this disclosure, an autonomous mode is defined as one in which each of vehicle 100 propulsion, braking, and steering are controlled by the computer 110; in a semi-autonomous mode the computer controls one or two of vehicle 100 propulsion, braking, and steering; in a non-autonomous mode, an operator controls the vehicle 100 propulsion, braking, and steering.

The computer 110 may include programming to operate one or more of land vehicle 100 brakes, propulsion (e.g., control acceleration in the vehicle 100 by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 network, e.g., including a communications bus as described further below, more than one processor, e.g., controllers or the like included in the vehicle 100 for monitoring and/or controlling various vehicle controllers, e.g., a powertrain controller, a brake controller, a steering controller, etc. The computer 110 is generally arranged for communications on a vehicle 100 communication network that can include a bus in the vehicle 100 such as a controller area network (CAN) or the like, and/or other wired and/or wireless mechanisms.

Via a communication network of the vehicle 100, the computer 110 may transmit messages to various devices in the vehicle 100 and/or receive messages from the various devices, e.g., an actuator 120, an HMI 140, etc. Alternatively or additionally, in cases where the computer 110 actually comprises multiple devices, the vehicle communication network may be used for communications between devices represented as the computer 110 in this disclosure.

The actuators 120 of the vehicle 100 are implemented via circuits, chips, or other electronic and/or mechanical components that can actuate various vehicle 100 subsystems in accordance with appropriate control signals, as is known. The actuators 120 may be used to control vehicle systems such as braking, acceleration, and/or steering of the vehicles 100.

The sensors 130 of the vehicle 100 may include a variety of devices known to provide data via the vehicle communications bus. For example, the sensors 130 may include one or more camera, radar, infrared, and/or Light Detection And Ranging (LIDAR) sensors 130 disposed in the vehicle 100 and/or on the vehicle 100 providing data encompassing at least some of the vehicle exterior. The data may be received by the computer 110 through a suitable interface such as in known. A LIDAR sensor 130 disposed, e.g., on a top of the vehicle 100, may provide object data including relative locations, sizes, and shapes of objects such as other vehicles surrounding the vehicle 100. The computer 110 may receive the object data and operate the vehicle 100 in an autonomous and/or semi-autonomous mode based at least in part on the received object data.

The vehicle 100 may include a Global Positioning System (GPS) sensor 130 configured to determine coordinates of a current location of the vehicle 100. The computer 110 may be programed, using known navigation techniques, to identify a route from the current location to a selected destination, as well as display a map and present driving directions to the selected destination via, e.g., the HMI 140.

In addition, the computer 110 may be configured for communicating through a vehicle-to-infrastructure (V-to-I) interface with other vehicles 100, drones 160, a remote computer 190, and/or a handheld device 180 via the vehicle 100 communication interface 145 and a network 195. The network 195 represents one or more mechanisms by which the computer 110 and the remote computer 190 may communicate with each other, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks 195 include wireless communication networks (e.g., using one or more of cellular, Bluetooth, IEEE 802.11, etc.), dedicated short range communications (DSRC), local area networks (LAN) and/or wide area networks (WAN), including the Internet, providing data communication services.

The HMI 140 presents information to and receives information from an occupant of the vehicle 100. The HMI 140 may be located, e.g., on an instrument panel in a passenger cabin of the vehicle 100, or one or more other locations accessible by the occupant. The HMI 140 may include dials, digital readouts, screens such as a touch-sensitive display screen, speakers, and so on for providing information to the occupant. The HMI 140 may include buttons, knobs, keypads, microphone, and so on for receiving information from the occupant.

The drone 160 is an unmanned aerial vehicle (UAV) and includes a number of circuits, chips, or other electronic and/or electromechanical components that can control various operations of the drone 160. For instance, the drone 160 may fly in accordance with control signals output to its propeller actuators. The drone 160 may be outfitted with a navigation system so that it can fly to, and hover at, a particular location. FIG. 1 illustrates the drone 160 flying over the vehicle 100. Within the context of this disclosure, hovering or flying "over" means flying at substantially a same longitude and latitude as of a respective vehicle 100, i.e., within 5 meters (m) of a center of the vehicle 100.

The drone 160 may include one or more sensors 165, e.g., a camera sensor 165 that can capture images of an area near, e.g., beneath, the drone 160. The drone 160 camera sensors 165 may be mounted to a same housing as the lights, and the drone 160 may be programmed to turn on the drone 160 camera sensors 165 to capture images of an area below the drone 160. Thus, when hovering over the vehicle 100, the drone 160 camera sensor 165 may capture images of one or more vehicles 100. Additionally or alternatively, a drone 160 may include other types of object detecting sensors 165 such as radar, LIDAR, etc.

Figure 2:
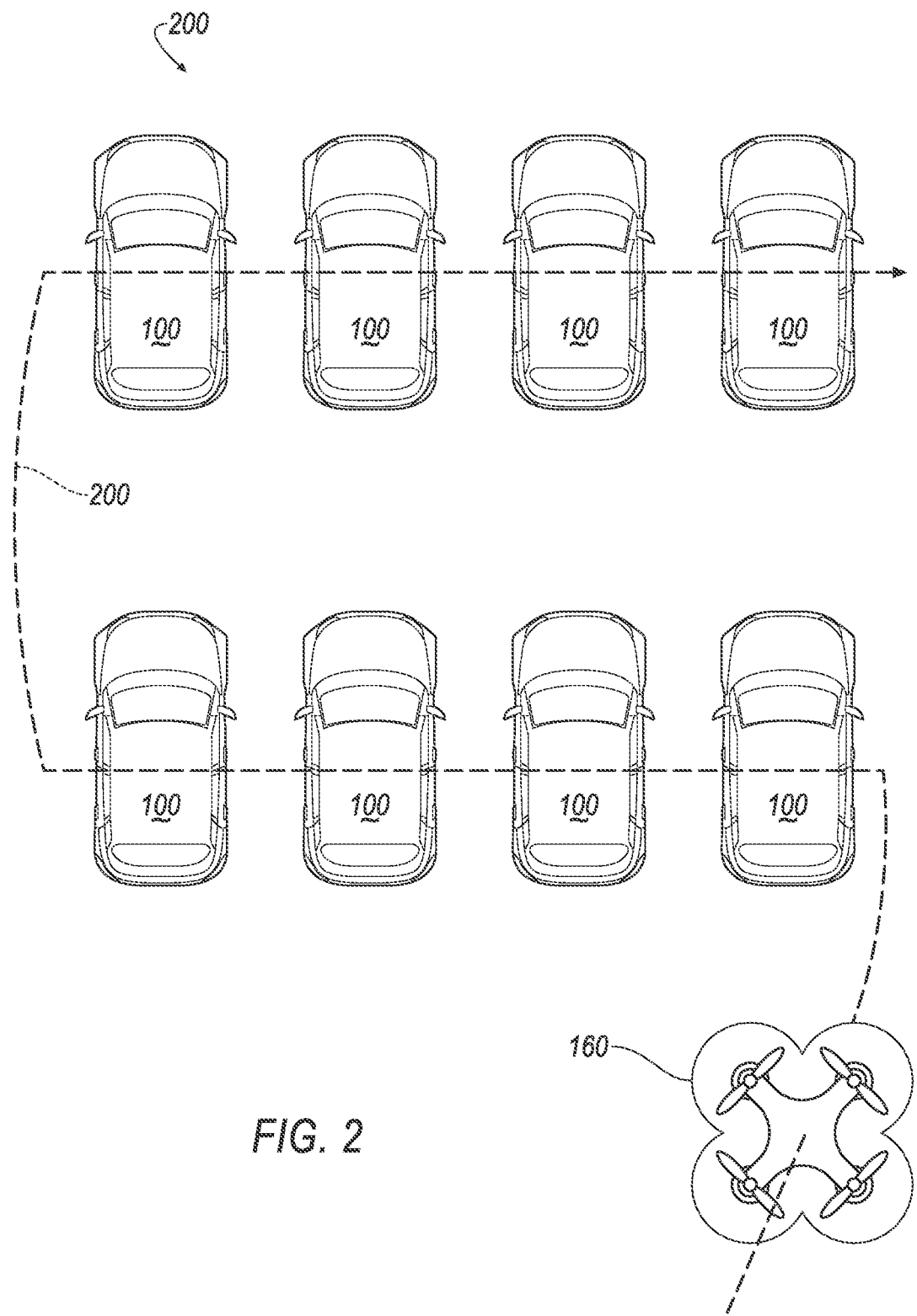
FIG. 2 is a block diagram showing the drone of FIG. 1 flying over the vehicles.

The drone 160 may include a GPS sensor 165 that provides GPS location coordinates (i.e., a latitude/longitude pair) of the drone 160, e.g., to a vehicle 100 computer 110, a drone 160 computer, etc. For example, the drone 160 computer may navigate the drone 160 based on the received GPS location coordinates, a predetermined route 200 (see FIG. 2), etc.

The drone 160 may include a wireless communication interface 170. The vehicle 100 computer 110, drone 160 computer, etc., may communicate, via the communication interfaces 145, 170, with one another and with a remote computer 190 via a network 195 that includes one or more telecommunication protocols, e.g., cellular technologies such as 3G, 4G, Long-Term Evolution (LTE), etc., Bluetooth®, Bluetooth Low Energy®, WiFi®, etc. In one example, the drone 160 and the vehicle 100 computer 110 may communicate via the wireless network 195 if the drone 160 and the vehicle 100 are within a distance $d_1$ that is within a communication range, e.g., 100 meters (m) for Bluetooth, of the communication protocol used for wireless communication.

The remote computer 190 and/or a handheld device 180 computer may be programmed to deploy the drone 160 from, e.g., a container, a launch pad, etc. To deploy the drone 160, the remote computer 190 may actuate a drone 160 actuator to take off and hover over the host vehicle 100. In one example shown in FIG. 2, the remote computer 190 may be programmed to deploy the drone 160 to fly and follow a route 200. The remote computer 190 may be programmed to determine the route 200 based on location coordinates of multiple vehicles 100, e.g., parked in a parking lot or the like. In one example, the remote computer 190 may be programmed to determine the route 200 such that the drone 160 can capture an image of each of the vehicles 100. In another example, the remote computer 190 may be programmed to determine multiple flight routes 200, e.g., by splitting the parking area into multiple smaller areas, and to deploy multiple drones 160 each following one of the determines flight routes 200.

The remote computer 190 can be programmed to receive, from an aerial drone 160, image data that identifies a vehicle 100, a location of the vehicle 100, and a status of the vehicle 100. The remote computer 190 can be further programmed to transmit an instruction to the vehicle 100 to actuate a vehicle 100 component based on the received image data. Additionally or alternatively, the handheld device 180 computer, the computer 110 in the vehicles 100, the remote computer 190, or a combination thereof can be programmed to execute the steps disclosed herein.

"Image data that identifies a vehicle 100" herein means that the received image data includes information pertaining to the vehicle 100 such as the vehicle 100 body, e.g., a top-view image. The image data may include data received from the drone 160 sensor 165 such as a camera, LIDAR, radar, etc. The image data may include a vehicle 100 identifier, a vehicle 100 model, and a vehicle 100 color. The vehicle 100 identifier may include a graphical pattern 155 on a body of the vehicle 100. The graphical pattern 155 may include a bar code, Quick Response (QR) code, etc.

"Status" of a vehicle 100 in the present disclosure refers to an inspection result of the vehicle 100, and "status" of a vehicle 100 component refers to a status of a vehicle 100 component. A vehicle 100 component status may include data associated with the component, e.g., fuel tank level, tire inflation status, Diagnostic Trouble Code (DTC) recording status, body damage status, etc. The vehicle 100 status may be determined based on one or more vehicle 100 component statuses. For example, the vehicle 100 status may be determined to be "approved," "acceptable," "ready," etc., upon determining that each of the vehicle 100 component statuses is acceptable or ready (e.g., fuel level and tire inflation acceptable, no DTC recorded, and no vehicle 100 body damage identified). Further, the vehicle 100 status may be "deficient", "disapproved", "failed", etc., upon determining that at least one of the vehicle 100 component statuses is not acceptable. In another example, the vehicle 100 status may be determined to be "approved", "acceptable", "ready", etc., upon determining that at least a certain percentage, e.g., 90 percent, of the vehicle 100 component statuses are "acceptable." Table 1 shows example statuses of various vehicle 100 components.

TABLE 1

| Status Data | Determined based on |
|---|---|
| Fuel Level | wireless communication with the vehicle computer |
| Tire inflation | wireless communication with the vehicle computer |
| DTCs | wireless communication with the vehicle 100 computer |
| Body damage | image processing |

The remote computer 190 may be programmed to identify the vehicle 100 based on the received image data, e.g., the graphical pattern 155. For example, the remote computer 190 may be programmed to identify the vehicle 100 based on A QR code graphical pattern 155 and data stored in the remote computer 190 associated with the respective QR code.

The remote computer 190 may be programmed to receive, via the aerial drone 160, a vehicle 100 wireless signal, and to determine the status of the vehicle based on the received vehicle 100 wireless signal and the received image data. The drone 160 computer may be programmed to transmit a request for status to the vehicle 100 while hovering above the vehicle 100 and/or broadcast a request for status to vehicles 100 within a communication range of the drone 160 wireless communication interface 170. The vehicle 100 computer 110 may be programmed to respond upon receiving the request for status message via the wireless communication interface 145. For example, the vehicle 100 computer 110 may be programmed to transmit a vehicle 100 identifier, e.g., Vehicle Identification number (VIN), vehicle 100 fuel level, tire inflation level, DTC status, location coordinates, etc. The remote computer 190 may be programmed to determine whether the vehicle 100 has a body damage, e.g., a dent, based on the received image data, e.g., using known image processing techniques.

The drone 160 computer may be programmed to determine the location of the vehicle 100 based on data location coordinates received from the vehicle 100 GPS sensor 130 and/or the drone 160 GPS sensor 165. For example, the remote computer 190 may be programmed to determine the location of the vehicle 100 based the location coordinates of the drone 160 and the received image data. In one example, the remote computer 190 may be programmed to determine that the vehicle 100 location coordinates are identical to the location coordinates of the drone 160 upon determining based on the image data that the drone 160 hovers right above the vehicle 100, i.e., perpendicularly above the vehicle 100.

As discussed above, the drone 160 may be programmed to receive a wireless signal from the vehicle 100. However, upon receiving a request for status, multiple vehicles 100 may respond by transmitting their respective statuses via the wireless network 195, e.g., vehicles 100 within the range of Bluetooth® network 195. The remote computer 190 may be programmed to receive, via the aerial drone 160, multiple vehicle 100 wireless signals and to identify the respective wireless signal of the vehicle 100 from the received wireless signals based on the received image data. For example, the remote computer 190 may be programmed to determine the vehicle 100 identifier, e.g., VIN, by identifying the graphical pattern 155 on the vehicle 100. In one example, the remote computer 190 may be programmed to determine the identifier by decoding the graphical pattern 155. In another example, the remote computer 190 may be programmed to decode the graphical pattern 155 to determine a reference number and lookup the vehicle 100 identifier in stored information (e.g., stored in the remote computer 190 memory) based on the determined reference number. As discussed above, the received data from the vehicles 100 may include the respective vehicle 100 identifier such as the VIN. Thus, the remote computer 190 may identify the wireless signal of the vehicle 100 based on the identifier of the vehicle 100 that is determined based on the received image data and is included in the received wireless signals. Additionally or alternatively, the remote computer 190 may be programmed to determine whether the received wireless signal is from the vehicle 100 by actuating a vehicle 100 exterior light 150 to flash and determining using the image processing techniques to determine whether the light 150 of the vehicle 100 flashes.

Figure 3:
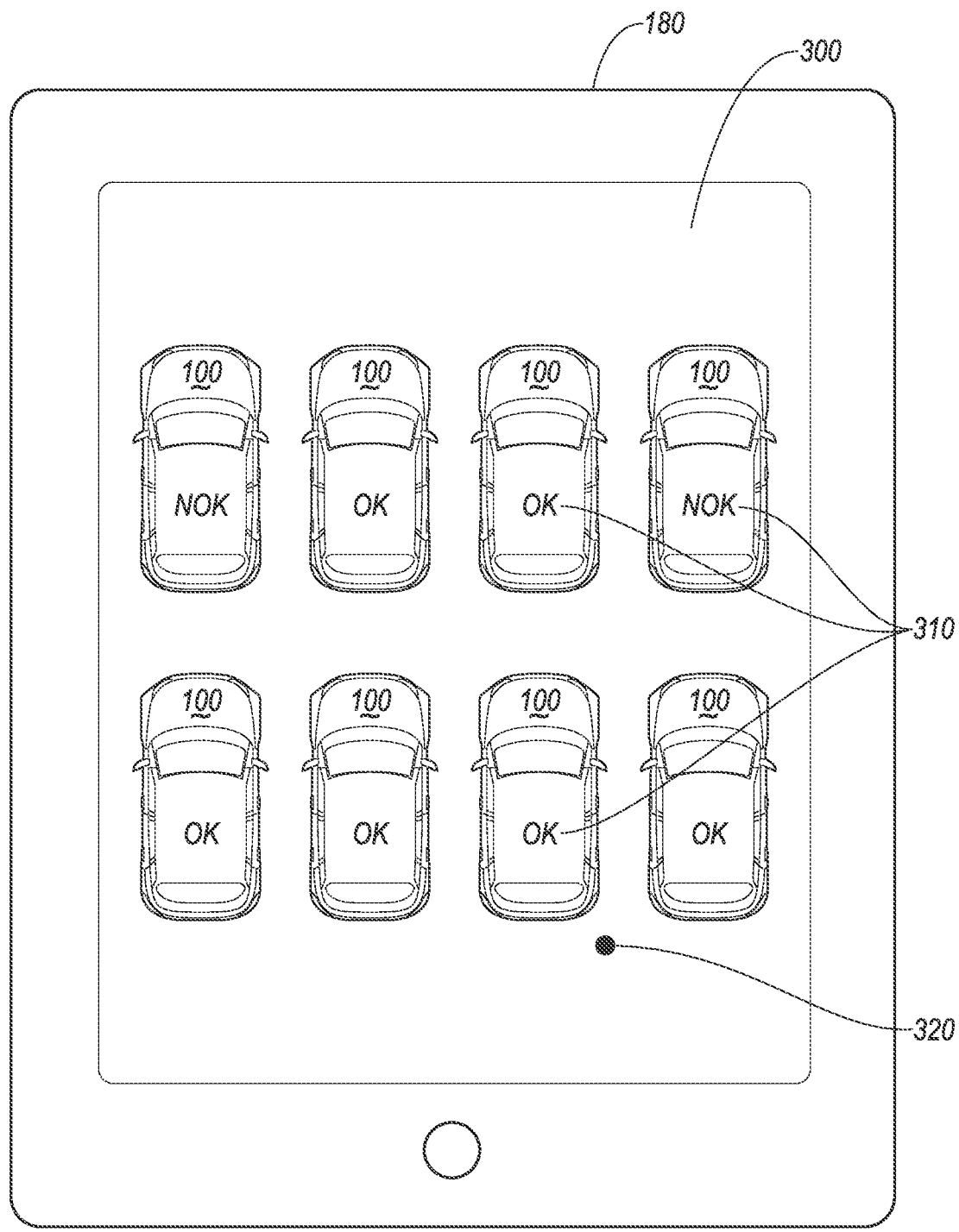
FIG. 3 shows the handheld device of FIG. 1 displaying an image including the vehicles.

As discussed above, multiple vehicles 100, e.g., hundreds or thousands of vehicles 100, may be stored in a parking area. In one example shown in FIGS. 2-3, the remote computer 190 can be programmed to deploy the aerial drone 160 to fly over the vehicles 100 and generate an image 300 including the vehicles 100. The image may be displayed on the handheld device 180. The remote computer 190 may be further programmed to overlay a respective vehicle 100 status, e.g., an overlay 310, of each of the vehicles 100 on the generated image 300. An overlay 310 includes an image including textual and/or graphical information that can be combined with the image 300 by placement of the overlay 310 in a specified area of the image 300, e.g., on a section of the image 300 where a respective vehicle 100 is displayed. Overlaying the respective vehicle 100 status may include displaying an approved (OK) or deficient (NOK) status for each of the vehicles 100, as shown in FIG. 3. The overlays 310 may include textual and/or graphical information including the received status of each of the vehicles 100.

The remote computer 190 may be programmed to deploy the drone 160 to fly over the vehicles 100, e.g., in a parking lot, by determining a flight route 200 based on location coordinates of the vehicles 100 and actuating the drone to fly based on the determined flight route 200. For example, the remote computer 190 may be programmed to determine the flight route 200 based on location coordinates of the vehicles 100, coordinates of the parking lot, number of vehicles 100, etc.

A user 185 may carry the device 180 while moving in the parking lot. In one example, the device 180 computer may be programmed to receive location coordinates of a handheld device 180 and superimpose the location of the handheld device 180 on the generated image 300, e.g., by displaying a symbol 320 in the image 300. Thus, advantageously the user may recognize its location relative to the vehicles 100.

In some examples, a device 180 user 185 can actuate components of vehicle 100 which meet a specified criterion or criteria, e.g., all vehicles 100 with fuel tank levels below ¼ full, all vehicles 100 scheduled to be shipped within the next hour, etc. In one example, the remote computer 190 may be programmed to receive a criterion or criteria and to actuate an exterior light 150 of a vehicle or vehicles 100 meeting the received criterion or criteria. The "classified vehicle 100" herein means the vehicle 100 that meets the received criteria. For example, the vehicle 100 with a low level of fuel in the tank may be the classified vehicle 100 when the criteria includes all vehicles 100 with low fuel level. Thus, based on a criterion, none, one, or more classified vehicles 100 may be classified.

The remote computer 190 may be programmed to actuate a vehicle 100 component based on a status of the vehicle 100. The remote computer 190 may be programmed to determine a destination based on the status data, e.g., a location of a shipping yard if the vehicle 100 status is approved, or a location of a repair station if the vehicle 100 status is deficient. The remote computer 190 may be further programmed to navigate the vehicle 100 to the determined destination by accelerating, steering, and braking. The remote computer 190 may transmit location coordinates of the vehicle 100 to the vehicle 100 via the wireless network 195.

Processing

Figure 4:
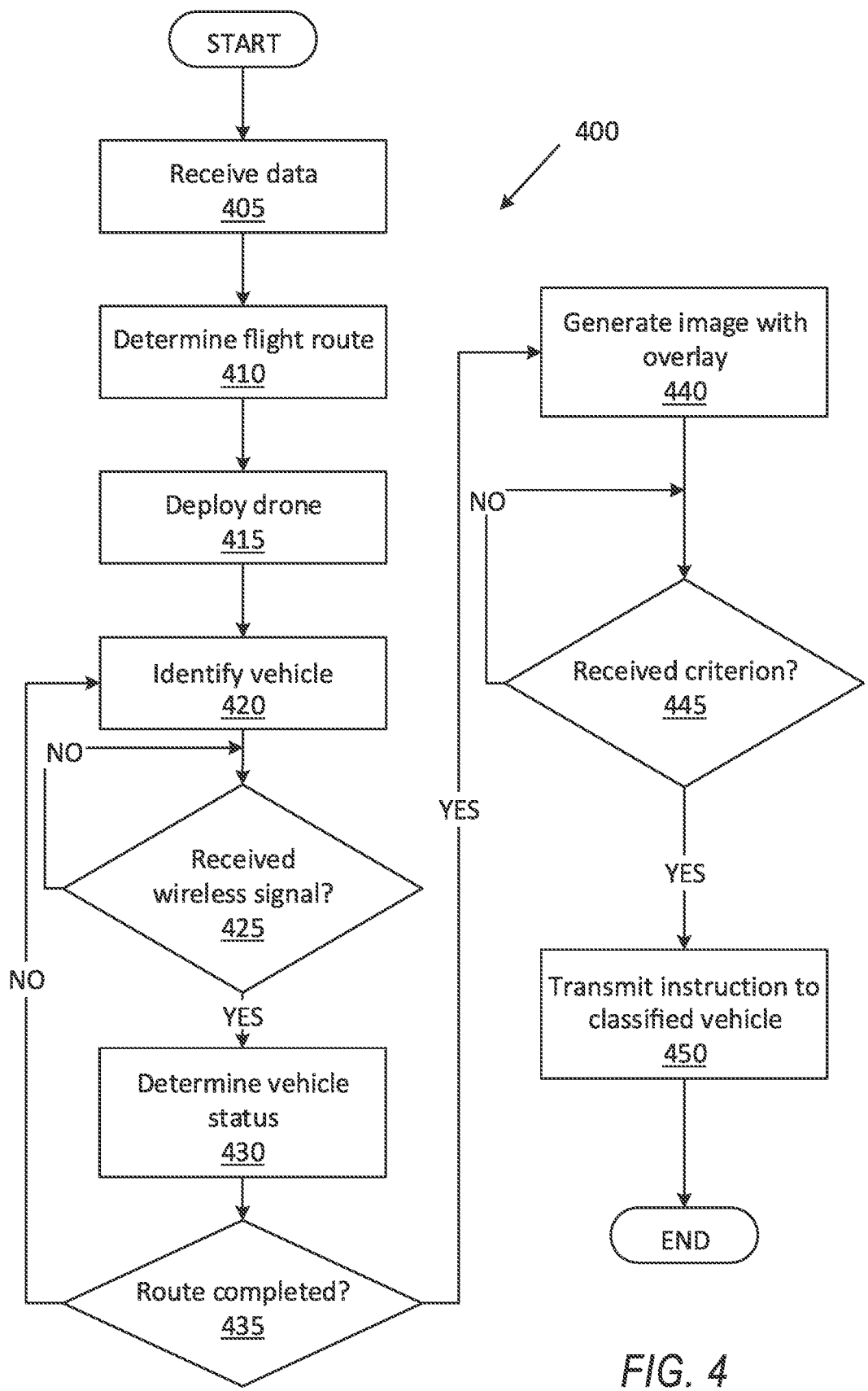
FIG. 4 is a flowchart of an exemplary process for a vehicle inspection operation.

FIG. 4 is a flowchart of an exemplary process 400 for a vehicle 100 inspection operation. A remote computer 190, a drone 160 computer, or a combination thereof may be programmed to execute blocks of the process 400.

The process 400 beings in a block 405, the remote computer 190 receives data from, e.g., vehicles 100, a production facility computer, etc. The remote computer 190 may be programmed to receive and store location coordinates of vehicle(s) 100 parking area, a number of vehicles 100, respective location(s) of vehicles 100, vehicles 100 identifiers, and/or shipping data such as scheduled shipping times of respective vehicles 100, etc.

Next in a block 410, the remote computer 190 determines a flight route 200 for the drone 160. The remote computer 190 may be programmed to determine the flight route 200 based on location coordinates of the vehicles 100 such that the drone 160 receives image data from each of the vehicles 100 by traversing the determined flight route 200. In one example, the remote computer 190 may be programmed to determine the flight route 200 using predetermined navigation patterns, e.g., linear sweeps of the parking area starting from south east corner and ending at north east corner of the parking area, circular paths starting from center of the parking area and spirally expanding to perimeter of the parking area, etc. Additionally, the remote computer 190 may be programmed to determine an altitude of the flight route 200 based on resolution of the drone 160 camera sensor 165, i.e., flying the drone 160 in such an altitude that the received image data can provide the vehicle 100 identifier such as the graphical pattern 155 data. Additionally or alternatively, the remote computer 190 may be programmed to determine multiple flight routes 200 for multiple drones 160, e.g., by splitting data collection among multiple drones 160. The flight routes 200 may include location coordinates and altitudes to be traversed by the drone 160, as well as times to be at respective locations and/or altitudes. The flight route 200 may include times in which image data should be taken, direction of drone 160 camera sensor 165 in times of receiving image, etc.

Next, in a block 415, the remote computer 190 deploys the drone(s) 160 to fly and follow the determined route(s) 200. For example, the remote computer 190 may be programmed to transmit the route 200 data via the wireless communication network 195 to the drone(s) 160.

Next, in a block 420, the remote computer 190 identifies a vehicle 100 based on received image data from the drone 160. The drone 160 can hover over the vehicle 100 and provide image data including vehicle 100 body, a graphical pattern 155, etc. The remote computer 190 may be programmed to identify the vehicle 100 based on the received data from the drone 160 and the received vehicles 100 identifiers, etc.

Next, in a decision block 425, the remote computer 190 determines whether a wireless signal is received from the vehicle 100. The remote computer 190 may be programmed to receive multiple wireless signals from multiple vehicles 100 and determine the wireless signal received from the vehicle 100 based on the identifier of the vehicle 100, e.g., the graphical pattern 155 included in the received image and/or the identifier can be looked up based on a reference number included in the graphical pattern 155. Additionally, the remote computer 190 may be programmed to transmit a request for status to the vehicle(s) 100 and receive the wireless signals in response of the vehicles 100 to the transmitted request (as discussed in FIG. 5). If the remote computer 190 determines that the wireless signal is received from the vehicle 100, then the process 400 proceeds to a block 430; otherwise the process 400 returns to the decision block 425.

In the block 430, the remote computer determines the vehicle 100 status. In one example, the remote computer 190 receives the image data via the drone 160 sensor 165 and wireless data such as fuel tank level, battery charge status, tire inflation status, DTC status, etc., via the drone 160 wireless communication interface 170. For example as shown in Table 1, the remote computer 190 may be programmed to determine one or more vehicle 100 component statuses, e.g., a fuel tank level status, tire inflation status, and DTC recording status based on the received wireless data and body damage based on the received image data, and determine the vehicle 100 status (i.e., whether the vehicle 100 is approved) upon determining that statuses of the vehicle 100 components are approved. In another example, the remote computer 190 receives the vehicle 100 status from the drone 160 (i.e., a drone 160 computer determines the vehicle 100 status based on the vehicle 100 component statuses). As discussed above, the vehicle 100 status may be determined to be "approved" upon determining that each of the vehicle 100 component statuses is approved; otherwise the vehicle 100 status is "deficient", "failed", etc. In another example, the vehicle 100 status may be determined to be "approved" upon determining that at least a percentage of vehicle 100 component statuses are "approved', e.g., at least 90 percent, of vehicle 100 component statuses are "approved", "acceptable", etc.

Next, in a decision block 435, the remote computer 190 determines whether the route is completed. The remote computer 190 may be programmed to determine that the route is completed upon determining that the drone 160 has travelled the determined route 200, e.g., based on the route 200 location coordinates and the drone 160 GPS sensor 165 data. If the remote computer 190 determines that the route 200 is completed, then the process 400 proceeds to a block 440; otherwise the process 400 returns to the block 420.

In the block 440, the remote computer 190 generates an image 300 with overlays 310 (see FIG. 3). In one example, the remote computer 190 can be programmed to generate the image 300 by combining multiple received image data from the drone 160, e.g., using image stitching techniques such as are known. The remote computer 190 may be further programmed to generate the overlays 310 based on respective vehicle 100 statuses and to superimpose overlays 310 on the generated image 300.

Next, in a decision block 445, the remote computer 190 determines whether a criterion or criteria is received, e.g., from the handheld device 180. In one example, a user 185 of the handheld device 180 may select one or more criteria from a list of criteria presented on the handheld device 180. The handheld device 180 may be programmed to transmit the list of selected criteria to the remote computer 190 via the wireless network 195. If the remote computer 190 determines that one or more criteria have been received, then the process 400 proceeds to a block 450; otherwise the process 400 returns to the decision block 445.

In the block 450, the remote computer 190 determines and transmits instructions to vehicles 100 meeting the criterion or criteria; such vehicles 100 can be identified by the drone 160 as described above. In another example, the remote computer 190 may be programmed to transmit a destination determined based on the status of the vehicle 100. Further, a plurality of vehicles 100 meeting a criterion or criteria can be instructed in a batch to proceed to a destination.

Following the block 450, the process 400 ends, or alternatively returns to the block 405, although not shown in FIG. 4.

Figure 5:
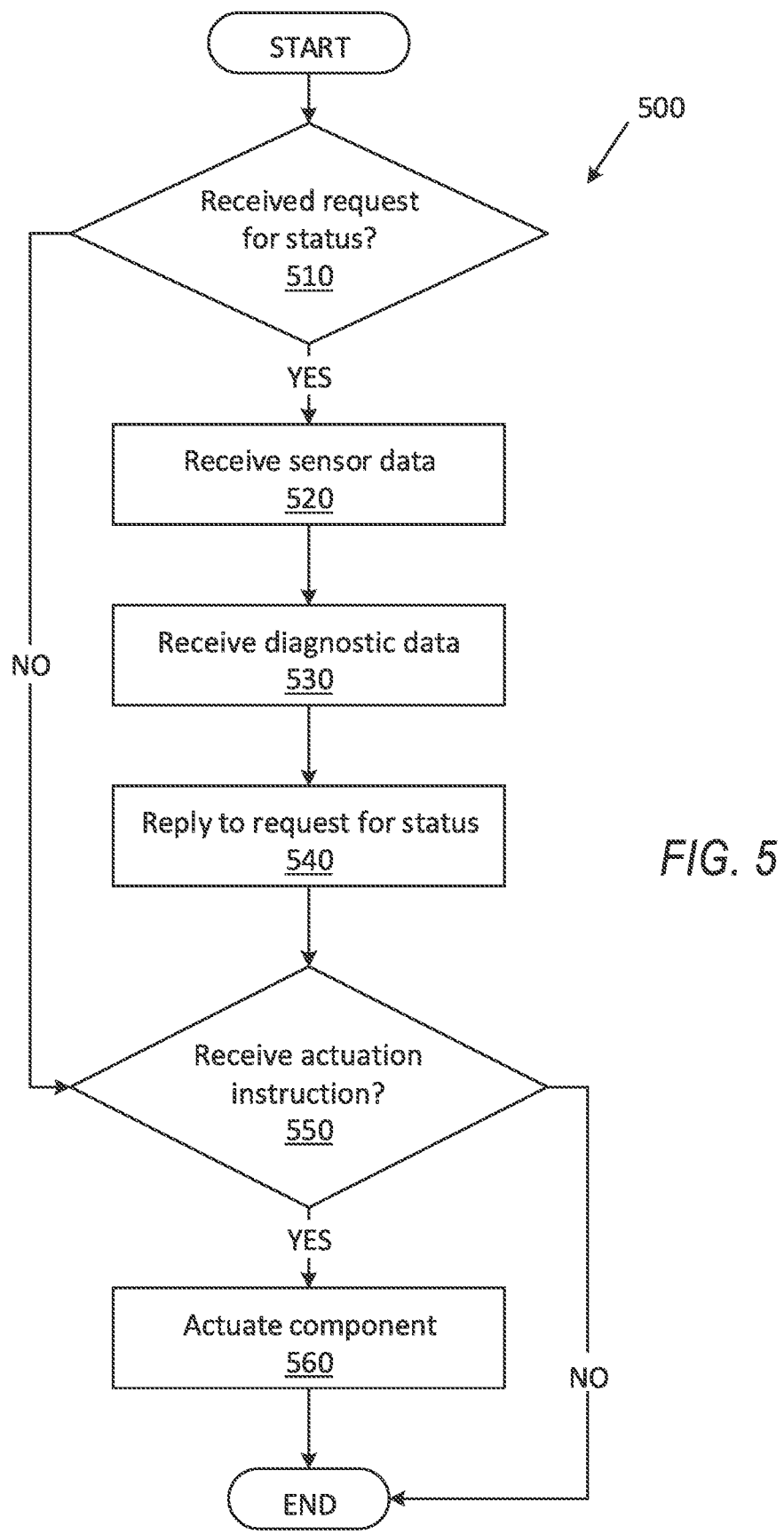
FIG. 5 is a flowchart of an exemplary process for a vehicle operation.

FIG. 5 is a flowchart of an exemplary process 500 for a vehicle 100 operation. For example, the vehicle 100 computer 110 may be programmed to execute blocks of the process 500.

The process 500 begins in a decision block 510, in which the computer 110 determines whether a request for status is received. The request may have been transmitted via the drone 160 (see FIG. 4). For example, the computer 110 may be programmed to receive the request for status via the vehicle 100 wireless communication interface 145. If the computer 110 determines that the request for status is received, then the process 500 proceeds to a block 520; otherwise the process 500 returns to a decision block 550.

In the block 520, the computer 110 receives sensor 130 data. For example, the computer 110 may be programmed to receive data from tire pressure sensor(s) 130, battery sensor 130, fuel level sensor 130, etc.

Next, in a block 530, the computer 110 receives diagnostic data. For example, the computer 110 may be programmed to receive a DTC status of vehicle 100 subsystems, ECUs, actuators 120, sensors 130, etc. The computer 110 may be programmed to receive diagnostic data via the vehicle 100 communication network that enables the vehicle 100 components such as ECUs, actuators 10, sensors 130, etc. to communicate with one another.

Next, in a block 540, the computer 110 replies to the request for status by transmitting the vehicle 100 status and/or the vehicle 100 component statuses (defined above). For example, the vehicle 100 computer 110 may be programmed to transmit the vehicle 100 status including information such as shown in Table 1 to the remote computer 190. Additionally, the computer 110 may be programmed to include the vehicle 100 identifier in the transmitted reply. Thus, the remote computer 110 or any other receiver may determine from which vehicle 100 the status is received.

Next, in a decision block 550, the computer 110 determines whether an instruction is received, e.g., from the remote computer 190. An instruction may include autonomously navigating to a destination, e.g., a shipping area, actuating a vehicle 100 light 150, etc. If the computer 110 determines that an instruction is received, then the process 500 proceeds to a block 560; otherwise the process 500 ends, or alternatively, returns to the decision block 510, although not shown in FIG. 5.

In the block 560, the computer 110 actuates one or more vehicle 100 components based on the received instruction. For example, the computer 110 actuates vehicle 100 acceleration, braking, an/or steering actuators 120 to autonomously navigate the vehicle 100 to the destination included in the received instruction. As another example, the computer 110 actuates the vehicle 100 exterior lights 150 to flash. Following the block 560, the process 500 ends, or alternatively, returns to the decision block 510, although not shown in FIG. 5.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a computer, programmed to:
    receive, from an aerial drone, a vehicle wireless signal and image data that identifies a vehicle, a vehicle location, and determine the vehicle status including a status of a component in the vehicle based on the received vehicle wireless signal and the received image data;
    store a criterion that includes at least one of approved vehicles, deficient vehicles, and a next shipping batch of vehicles;
    identify the vehicle from the received image data; and
    based on a status of the component with respect to the criterion, transmit an instruction to the vehicle to actuate the component.

2. The system of claim 1, wherein the computer is further programmed to identify the vehicle based on the received image data.

3. The system of claim 1, wherein the computer is further programmed to receive, via the aerial drone, a vehicle wireless signal; and
    determine the status of the vehicle based on the received vehicle wireless signal and the received image data.

4. The system of claim 3, wherein the computer is further programmed to:
    receive, via the aerial drone, a plurality of vehicle wireless signals from a plurality of vehicles; and
    identify the respective vehicle wireless signal of the vehicle from the plurality of wireless signals based on the received image data.

5. The system of claim 1, wherein the computer is further programmed to identify the vehicle based on at least one a vehicle identifier, a vehicle model, and a vehicle color included in the received image.

6. The system of claim 5, wherein the vehicle identifier includes a graphical pattern on a body of the vehicle.

7. The system of claim 1, wherein the computer is further programmed to actuate the vehicle component by:
    determining a destination based on the received status of the vehicle; and
    navigating the vehicle to the determined destination by at least one of accelerating, steering, and braking.

8. The system of claim 1, wherein the computer is further programmed to:
    deploy the aerial drone to fly over a plurality of vehicles;
    generate an image including the plurality of vehicles, and
    overlaying a respective vehicle status of each of the vehicles on the generated image.

9. The system of claim 8, wherein overlaying the respective vehicle status includes displaying one of an approved and deficient status for each of the plurality of vehicles.

10. The system of claim 8, wherein deploying the drone to fly over the plurality of vehicles further includes:
    determining a flight route based on location coordinates of the plurality of vehicles; and
    actuating the drone to fly based on the determined flight route.

11. The system of claim 8, wherein the computer is further programmed to:
    receive a handheld device location; and
    superimpose the handheld device location on the generated image.

12. The system of claim 1, wherein the computer is further programmed to:
    actuate a vehicle exterior light based on the criterion.

13. The system of claim 1, further comprising a second computer included in the aerial drone, programmed to determine the location of the vehicle based on at least one of vehicle sensor data and drone sensor data.

14. A system, comprising a computer, programmed to:
receive, from an aerial drone, a vehicle wireless signal and image data that identifies a vehicle, a vehicle location, and determine the vehicle status including a status of a component in the vehicle based on the received vehicle wireless signal and the received image data; and
based on the received image data and the vehicle wireless signal, transmit an instruction to the vehicle to actuate a vehicle component by
determining a destination based on the received status of the vehicle; and
navigating the vehicle to the determined destination by at least one of accelerating, steering, and braking.

15. The system of claim 14, wherein the computer is further programmed to:
deploy the aerial drone to fly over a plurality of vehicles;
generate an image including the plurality of vehicles, and overlaying a respective vehicle status of each of the vehicles on the generated image.

16. The system of claim 15, wherein the computer is further programmed to:
receive a handheld device location; and
superimpose the handheld device location on the generated image.

17. A system, comprising a computer, programmed to:
receive, from an aerial drone, image data that identifies a vehicle, a vehicle location, and a vehicle status;
based on the received image data, transmit an instruction to the vehicle to actuate a vehicle component;
deploy the aerial drone to fly over a plurality of vehicles;
generate an image including the plurality of vehicles, and overlay a respective vehicle status of each of the vehicles on the generated image.

18. The system of claim 17 wherein overlaying the respective vehicle status includes displaying one of an approved and deficient status for each of the plurality of vehicles.

19. The system of claim 17, wherein deploying the drone to fly over the plurality of vehicles further includes:
determining a flight route based on location coordinates of the plurality of vehicles; and
actuating the drone to fly based on the determined flight route.

20. The system of claim 17, wherein the computer is further programmed to:
receive a handheld device location; and
superimpose the handheld device location on the generated image.

* * * * *